United States Patent [19]

Kassai

[11] Patent Number: 4,779,304
[45] Date of Patent: Oct. 25, 1988

[54] CASTER HAVING A ROTARY YOKE LOCKING MECHANISM

[75] Inventor: Kenzou Kassai, Osaka, Japan

[73] Assignee: Aprica Kassai Kabushiki Kaisha, Osaka, Japan

[21] Appl. No.: 90,565

[22] Filed: Aug. 28, 1987

[30] Foreign Application Priority Data

Sep. 10, 1986 [JP] Japan .................. 61-214820

[51] Int. Cl.$^4$ .................................................... B60B 33/02
[52] U.S. Cl. ........................................... 16/35 R; 16/48
[58] Field of Search ............. 16/45, 35 R, 35 D, 31 R, 16/31 A, 20, 29, 18 R, 46, 47, 48; 280/47.38, 47.39, 47.41

[56] References Cited

U.S. PATENT DOCUMENTS 3,949,444 4/1976 Mattinson ..................... 16/35 R

FOREIGN PATENT DOCUMENTS 57-55201 4/1982 Japan ............................ 16/45

Primary Examiner—Fred A. Silverberg
Attorney, Agent, or Firm—W. G. Fasse; D. H. Kane, Jr.

[57] ABSTRACT

A caster, for example for mounting the wheels of a baby carriage has a fixed bracket (14), a rotary yoke (15) rotatably supported by the fixed bracket (14), and a wheel (17) rotatably supported by the rotary yoke (15) with the aid of an axle (16). The rotary yoke (15) is formed an elongated opening (29) which extends horizontally at right angles to the axle (16). The axle (16) is held in the elongated opening (29) and is horizontally movable in the elongaged opening (29) under the influence of a guide opening or slot in an axle guide which intersects with the elongated opening.

5 Claims, 8 Drawing Sheets

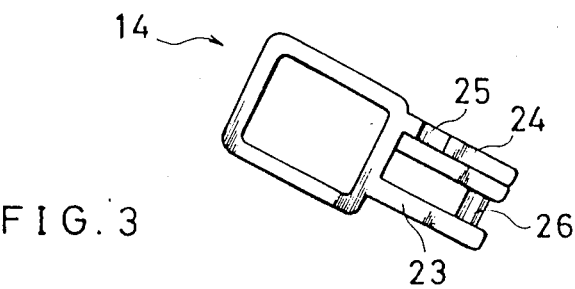
FIG. 4
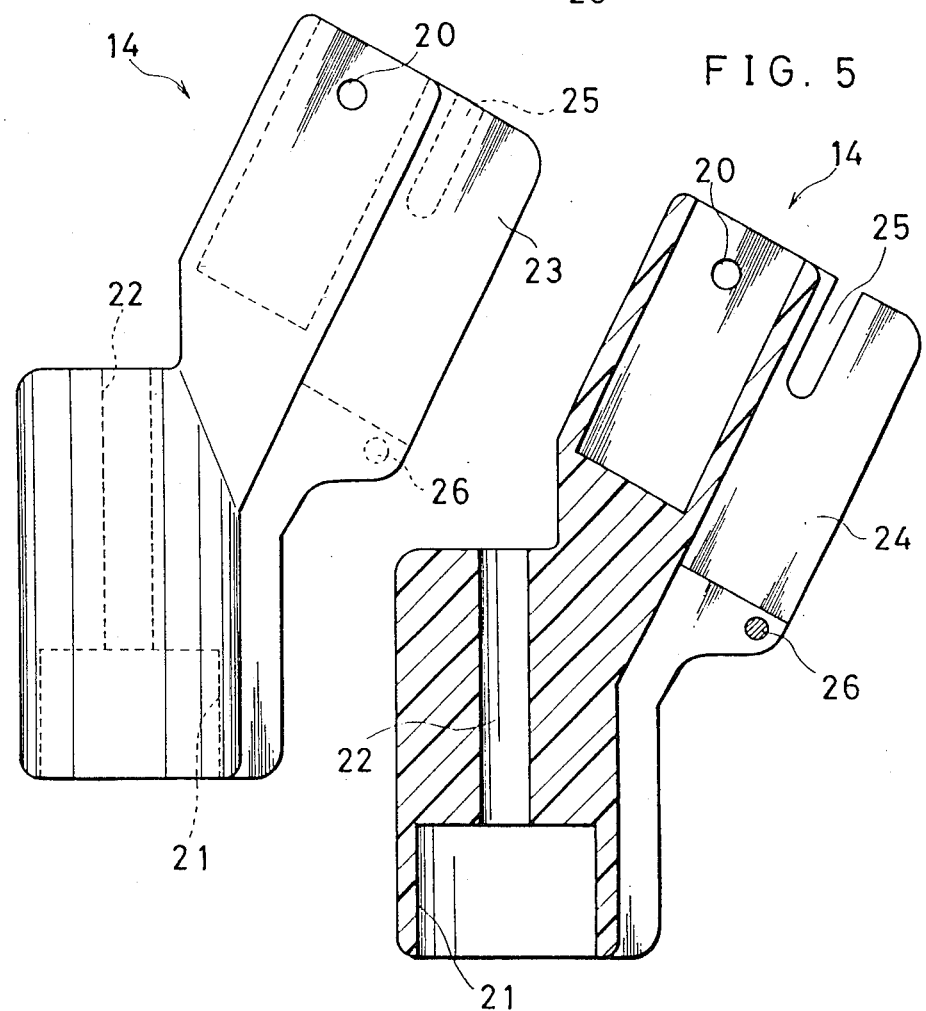
FIG. 3
FIG. 5

FIG.15
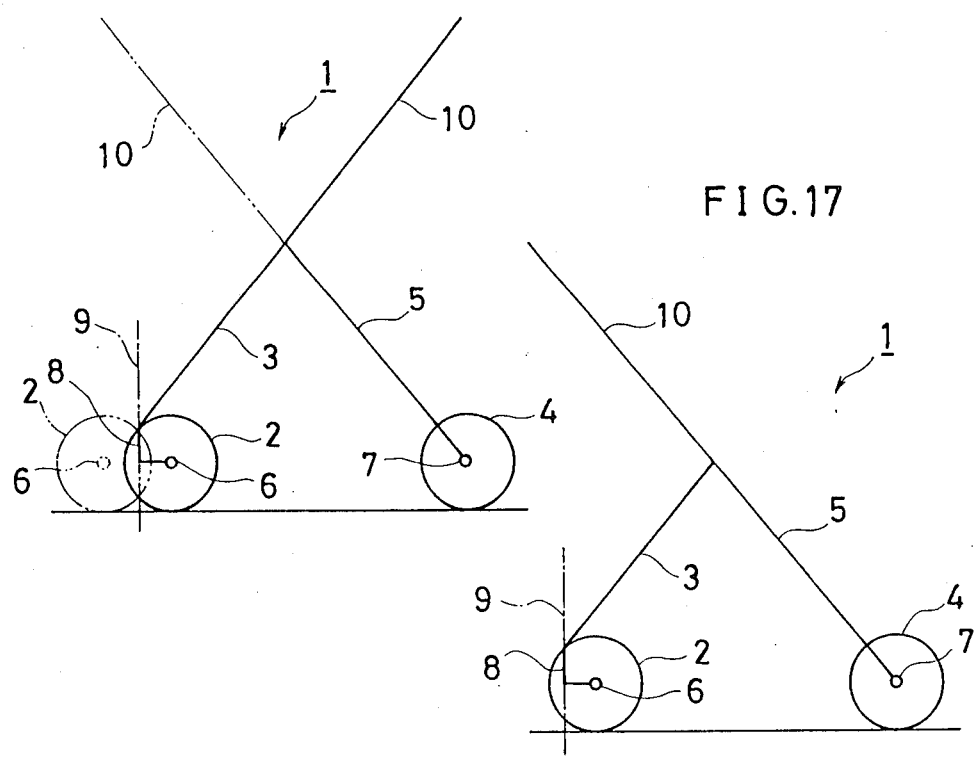
FIG.17
FIG.16
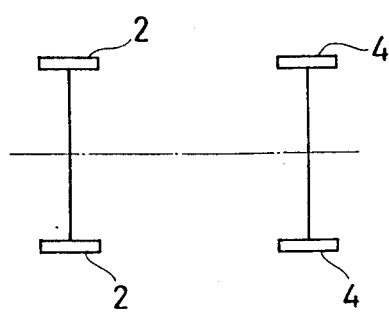
FIG.18
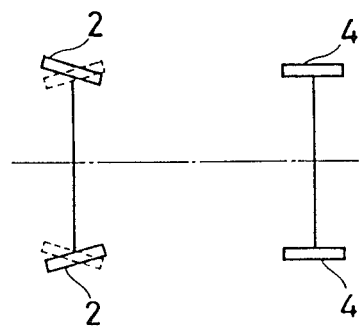

CASTER HAVING A ROTARY YOKE LOCKING MECHANISM

BACKGROUND OF THE INVENTION

1. Field of the Invention

This invention relates to a caster attached to a movable body to facilitate a change in the direction of movement of said body.

2. Description of the Prior Art

Casters are attached to a carrying unit or a body to be moved, such as a baby carriage for facilitating changing the movement direction.

FIG. 15 is a diagrammatic view showing a baby carriage of the type in which the push rod can be switched between two states, one for the face-to-back push mode and the other for the face-to-face push mode, wherein the front wheels are swivelable by casters. The baby carriage 1 shown comprises a pair of right and left front legs 3 rotatably supporting front wheels 2 at their lower ends through an axle 6, a pair of right and left rear legs 5 rotatably supporting rear wheels 4 at their lower ends through an axle 7, and a push rod 10. The push rod is installed in a pivotable or hingeable manner so that it can be switched between two states, one for the face-to-back push mode and the other for the face-to-face push mode. The position shown in solid lines in FIG. 15 corresponds to the face-to-back push mode of the push rod 10, while the dash-dotted line position corresponds to the face-to-face push mode of the push rod 10.

A caster 8 is attached to the lower end of each front leg 3. The caster 8 is turnable around the axis of rotation 9 and rotatably supports the front wheel 2 through the axle 6 which extends horizontally at a position horizontally spaced from the axis of rotation 9.

In the case where the baby carriage is moved on a flat road in the face-to-back push mode, the axle 6 for the front wheels 3 is positioned rearwardly of the axis of rotation 9 of the caster with respect to the direction of travel. FIG. 16 is a plan view diagrammatically showing the positional relationship of the two front wheels 2 and two rear wheels 4 and the directional orientation of the wheels with respect to the direction of travel. When the baby carriage 1 is moving straight in the face-to-back push mode, the two front wheels 2 and two rear wheels 4 are arranged in parallel to the direction of travel, as shown in FIG. 16. When it is desired to change the direction of the baby carriage 1, the casters 8 suitably swivel for facilitating the change of direction. Thus, the provision of casters 8 on the baby carriage 1 results in an improved operability.

The operation or switching of the mode shown in FIG. 15 to the face-to-face push mode and moving the baby carriage 1 will now be described. When the push rod 10 is switched to the face-to-face push mode as shown in phantom lines in FIG. 15 and the baby carriage is moved, the casters 8 are swiveled through 180 degrees and the front wheels 2 assume the dash-dotted line position. In this state, the axle 6 for the front wheels 2 is positioned rearwardly of the axis of rotation 9 of the casters 8 with respect to the direction of travel. Therefore, when the baby carriage 1 is moving straight, the pair of front wheels are parallel with respect to the direction of travel, as shown in FIG. 16.

When the baby carriage 1 is moved on a flat road, the casters 8 swivel as required, increasing the operability of the baby carriage 1. However, when the baby carriage is moved on a bad road, the swiveling action of the casters 8 does not improve the operability of the baby carriage 1, contrary to the expectation. Thus, such a baby carriage is generally provided with locking means for inhibiting the swiveling action of casters 8 as required.

However, with the casters 8 left locked, the user may sometimes forget to unlock them. In that case, the following problem arises. For example, suppose that the push rod 10 is in the face-to-back push mode and that the baby carriage 1 is being moved with the casters 8 in the locked position. Also suppose that the push rod 10 is changed to the face-to-face push mode without unlocking the casters 8. When the baby carriage 1 is moved under these conditions, the baby carriage is in a state in which it is very hard to push.

That is, as shown in FIG. 17, the axle 6 for the front wheels 2 is positioned forwardly of the axis of rotation 9 of the casters 8 with respect to the direction of travel. Even when the swiveling action of the casters 8 is inhibited by the locking means, there is still some play. Thus, if the baby carriage 1 is moved in the state shown in FIG. 17, the pair of front wheels 2 will swivel at random, as shown in FIG. 18. When the pair of front wheels 2 assumes a slanted position as shown in solid or dotted lines in FIG. 18, the front wheels 2 act as brakes, making it more difficult to push the baby carriage 1.

SUMMARY OF THE INVENTION

This invention has eliminated the problem described above and its object is to provide a caster which is constructed so that even when a movable body is moved with the caster left locked and with the direction of travel reversed, the operability of the caster supported movable body is not impeded.

A caster according to the invention comprises a fixed bracket fixedly attached to a movable body, a rotary yoke supported in said fixed bracket for rotation around a vertical axis, and a wheel rotatably supported by said rotary yoke on a horizontal axle. The rotary yoke has an elongated opening extending at right angles to said axle. Further, the axle is held in said elongated opening and is adapted to move horizontally in said elongated opening.

Since the axle of the wheel is held in the elongated opening which extends horizontally and at right angles to said axle, when the movable body is being moved, the axle is held at one end of the elongated opening which is positioned rearwardly with respect to the direction of travel. In this state, if the rotation of the rotary yoke is inhibited and the body is moved with the direction of travel reversed, the axle is moved in the elongated opening until it is held at the other end of the elongated opening which is positioned rearwardly with respect to the direction of travel. In this manner, the axle of the wheel is always positioned rearwardly with respect to the direction of travel, so that the aforesaid undesirable swiveling movement is prevented.

Thus, according to the caster of this invention, even when the body is moved, whether the caster is unlocked or left locked, the operability of said target movable body is not impeded.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a front view of a fixed bracket shown in FIG. 1;

FIG. 4 is a top view of the fixed bracket shown in FIG. 3;

FIG. 5 is a vertical sectional view of FIG. 3;

FIG. 15 is a diagrammatic view of a baby carriage in which the push rod can be switched between two states, one for the face-to-back push mode and the other for the face-to-face push mode and casters are attached to the lower ends of the front legs;

FIG. 16 is a plan view schematically showing the positional relationship and direction of the pair of front wheels and pair of rear wheels of the baby carriage;

FIG. 17 is a diagrammatic view of the state established when the push rod is switched from the state of FIG. 15 to the face-to-face push mode; and FIG. 18 is a view similar to that of FIG. 16 but schematically showing the pair of front wheels 2 swiveling.

ESCRIPTION OF THE PREFERRED EMBODIMENTS AND OF THE BEST MODE OF THE INVENTION

Figure 1:
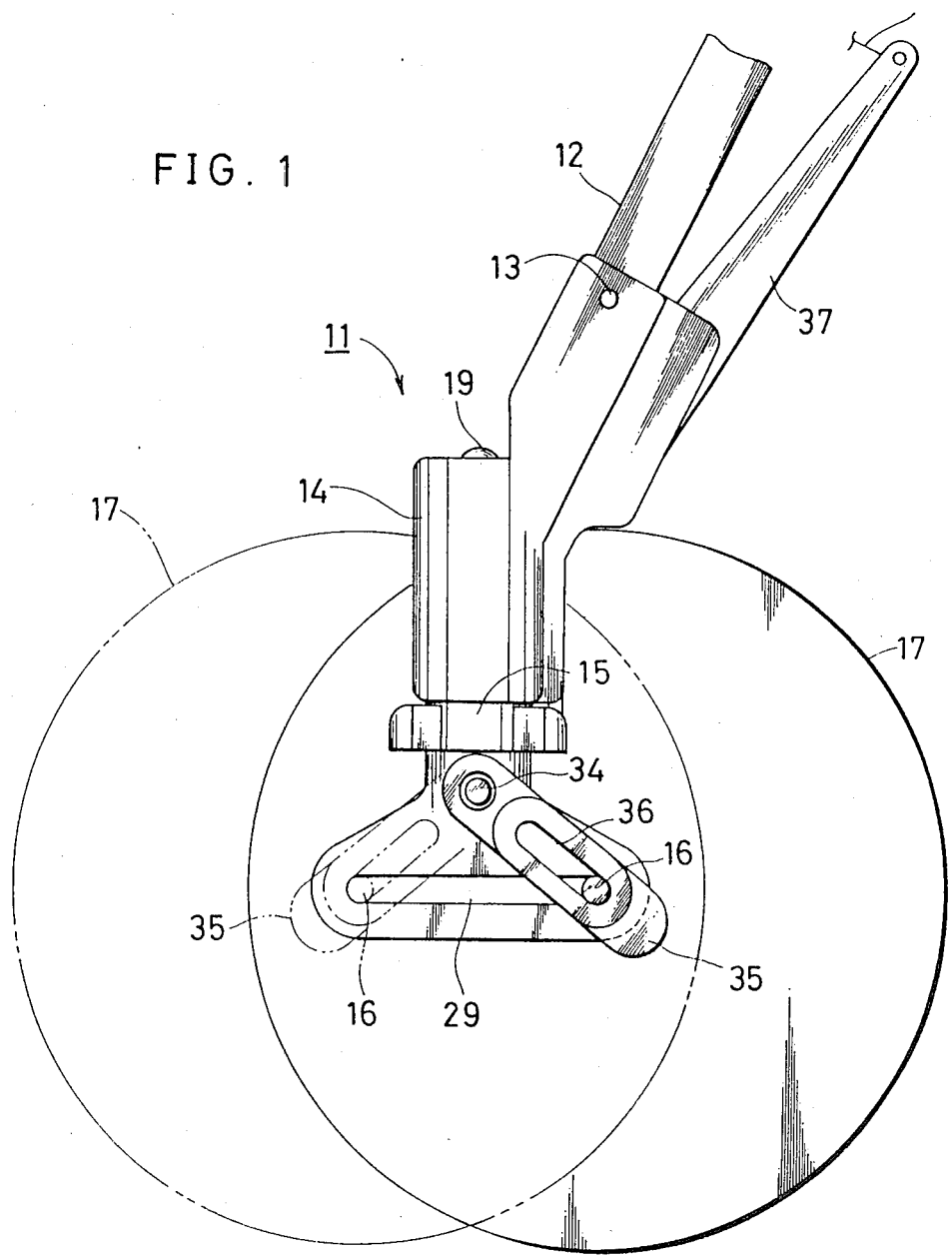
FIG. 1 is a front view showing an example of the invention.
Figure 2:
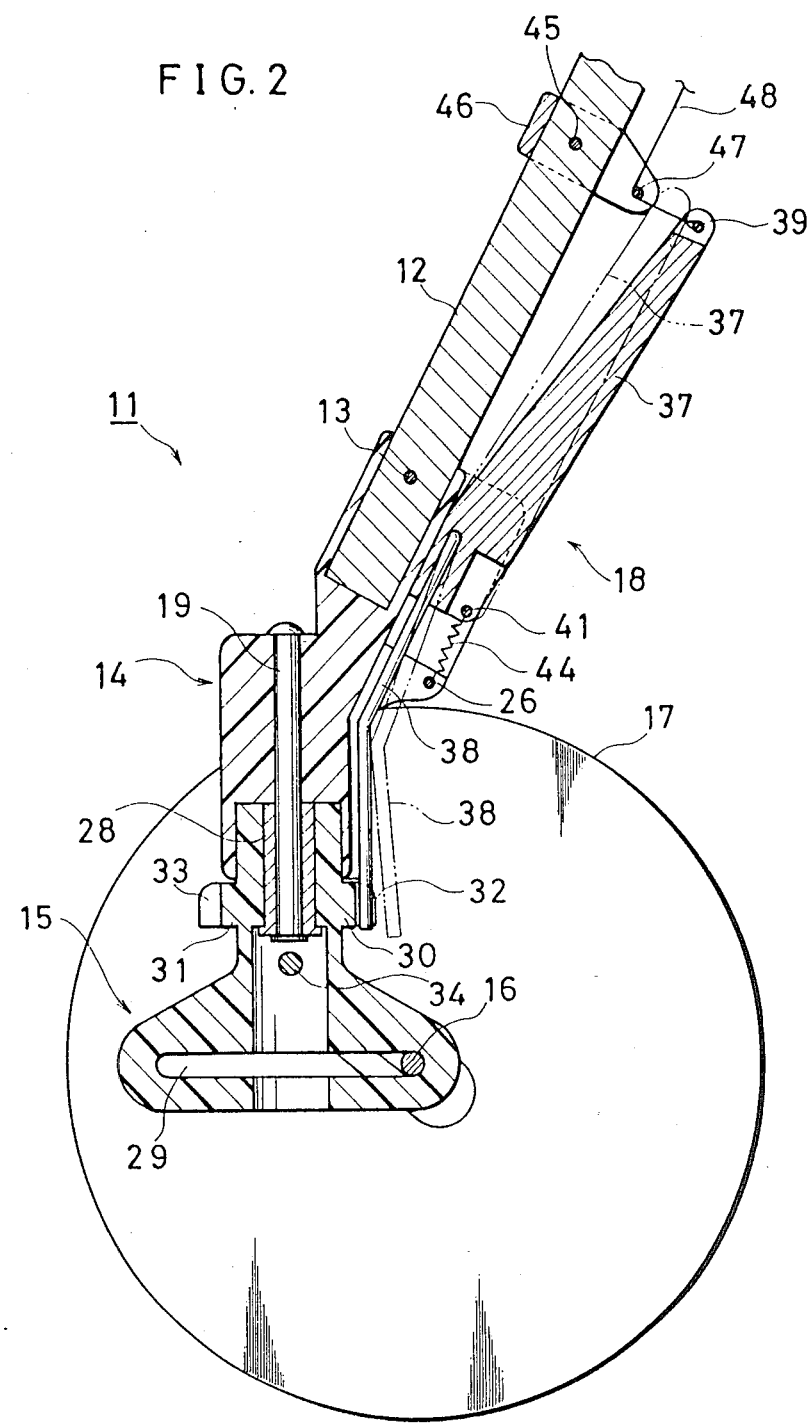
FIG. 2 is a vertical sectional view of FIG. 1.

Referring to FIGS. 1 and 2 an embodiment of the invention as applied to the front legs of a baby carriage, will now be described.

A caster 11 comprises a fixed bracket 14 fixedly attached at its upper end to a front leg of a baby carriage by a pin 13, a rotary yoke 15 rotatably supported in said fixed bracket 14, and a wheel 17 rotatably supported by said rotary yoke 15 with the aid of a horizontal axle 16. Caster locking means 18 is provided in connection with the front leg 12 of the baby carriage and the caster 11. The caster locking means 18 inhibits the rotation of the rotary yoke 15 relative to the fixed bracket 14, to thereby inhibit the caster 11 from swiveling.

In FIGS. 3 to 5, the fixed bracket 14 is shown in detail. A through-hole 20 shown in FIGS. 3 and 5 is used to receive the pin 13 shown in FIG. 2. As is clear front FIG. 5, the lower end of the fixed bracket 14 is formed with a cylindrical opening 21. The fixed bracket 14 is also formed with a central hole 22 communicating with said cylindrical opening 21 and extending vertically. A support shaft 19 shown in FIG. 2 is inserted in the central hole 22 and held therein.

The fixed bracket 14 has a pair of parallel projecting walls 23 and 24 extending rearwardly from the bracket 14. One projecting wall 24 disposed on the inner side is formed with a notch 25 extending downwardly from the upper end. The lower portions of the projecting walls 23 and 24 carry a fixed shaft 26 which connects the projecting walls 23 and 24.

Figure 7:
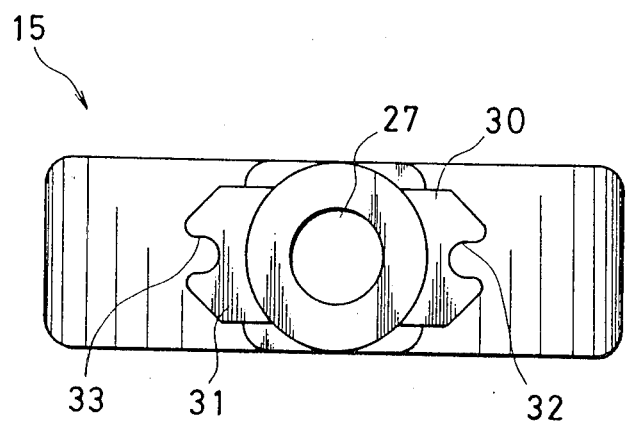
FIG. 7 is a front view of FIG. 6.
Figure 6:
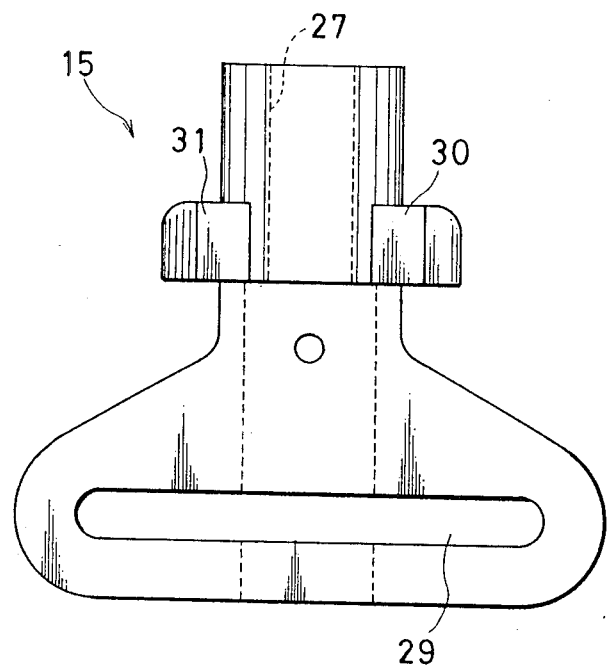
FIG. 6 is a front view of a rotary yoke shown in FIG. 1.

In FIGS. 6 and 7, the rotary yoke 15 is shown in detail. The rotary yoke 15 is cylindrical in its upper portion, and said cylindrical portion is fitted in the cylindrical opening 21 in the fixed bracket 14. The rotary yoke 15 has a vertically extending central opening 27. A sleeve 28 is fitted in said central opening 27. Referring to FIG. 2, the support shaft 19 extends through the sleeve 28. In this manner, the rotary yoke 15 is supported by the fixed bracket 14 for rotation around the axis of the support shaft 14.

Referring to FIGS. 2 and 6, the lower end portion of the rotary yoke 15 is formed with an elongated opening 29 extending horizontally across the axis of rotation of said rotary yoke 15. The axle 16 extends through said elongated opening 29 and carries two wheels 17 on the opposite ends thereof. Thus, the axle 16 of the wheels 17 is capable of moving horizontally in the elongated opening 29 in the rotary yoke 15.

Referring to FIGS. 6 and 7, the rotary yoke 15 is provided with two projections 30 and 31 at positions which are point-symmetrical with respect to the center of the support shaft 19 inserted in the central opening 27. These projections 30 and 31 have engaging recesses 32 and 33, respectively, extending vertically.

Figure 9:
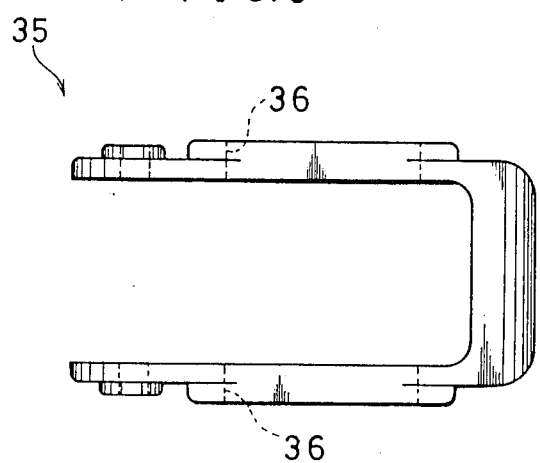
FIG. 9 is a plan view of FIG. 8.
Figure 8:
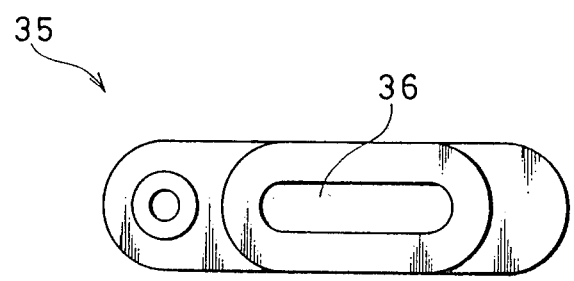
FIG. 8 is a front view of an axle guide shown in FIG. 1.

Referring to FIG. 1, an axle guide 35 adapted to overlap the elongated opening 29 is rotatably attached to the rotary yoke 15 by a pin 34. In FIGS. 8 and 9, the axle guide 35 is shown in detail. As illustrated, the axle guide 35 has an elongated guide openings 36 extending long toward the axis of rotation thereof and adapted to receive the axle 16 of the wheels 17. As shown in FIG. 1, the axle 16 of the wheels 17 is held at the intersection between the elongated opening 29 in the rotary yoke and the elongated guide opening 36 in the axle guide 35. The axle guide 35 acts to prevent the axle 16 from revolving in a horizontal plane inside the elongated opening 29.

FIGS. 1 to 9 show the construction associated with that one of the pair of casters of the baby carriage which is disposed on the left side. The casters on the right and left sides are the same in basic construction.

The detailed construction of the caster locking means 18 will now be described with reference to FIGS. 2 and 10 to 14.

Figure 10:
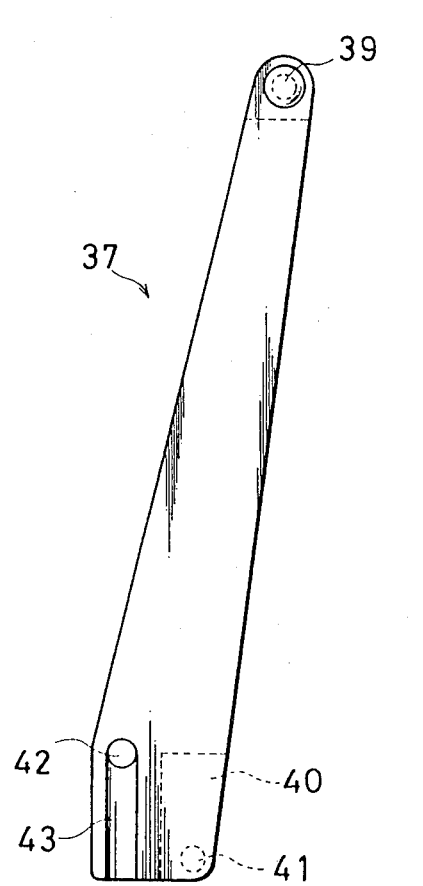
FIG. 10 is a front view of a rotary arm shown in FIG. 2.
Figure 11:
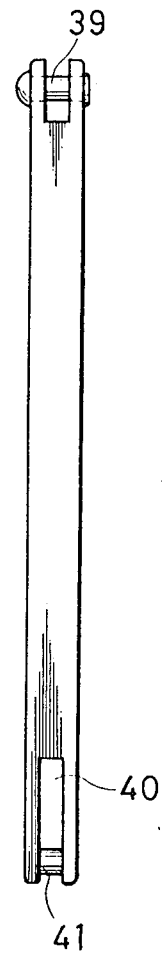
FIG. 11 is a right-hand side view of the rotary arm shown in FIG. 10.
Figure 12:
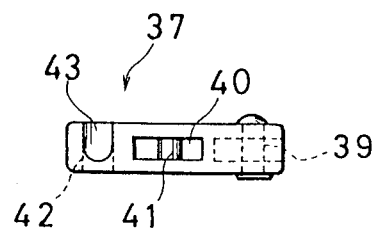
FIG. 12 is a bottom view of the rotary arm of FIG. 10.

First, referring to FIG. 2, the caster locking means 18 comprises a rotary arm 37 rotatably attached to the fixed bracket 14, and a stopper rod 38 secured to the rotary arm 37. FIGS. 10 to 12 show the rotary arm 37 in detail, while FIGS. 13 and 14 show the stopper rod 38 in detail.

Referring to FIGS. 10 to 12, the upper end portion of the rotary arm 37 is bifurcated, and a shaft 39 is attached to the bifurcated portion. The lower end portion of the rotary arm 37 is formed with an opening 40 and a shaft 41 is provided in said opening 40. The lower end portion of the rotary arm 37 is formed with a through-hole 42 and a vertical groove 43. The vertical groove 43 extends to connect the lower end of the rotary arm 37 to the through-hole 42. The rotary arm 37 of such shape is positioned between the pair of projecting walls 23 and 24 which extend from the rear portion of the fixed bracket 14.

Figure 13:
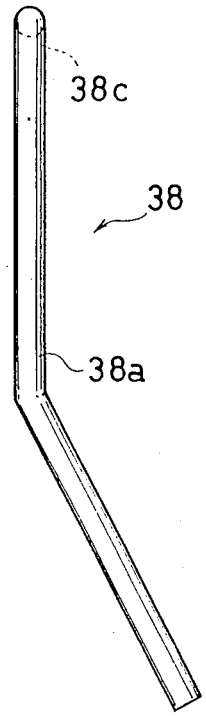
FIG. 13 is a front view of a stopper rod shown in FIG. 2.
Figure 14:
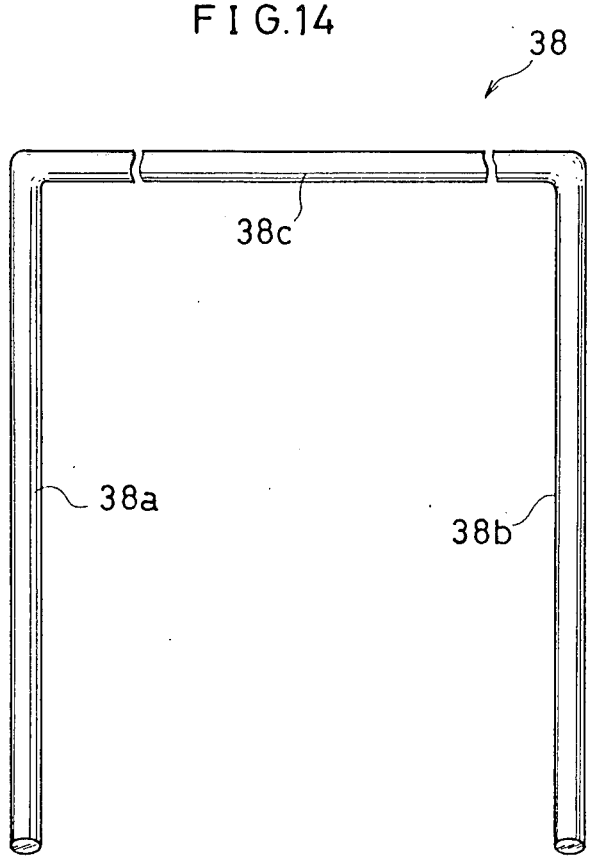
FIG. 14 is a right-hand side view of the stopper rod shown in FIG. 13.

Referring to FIGS. 13 and 14, the stopper rod 38 has an inverted U-shape as a whole, having a pair of downwardly extending leg portions 38a and 38b, and a connecting portion 38c extending to connect said leg portions. The connecting portion 38c connects the pair of casters positioned on the right and left sides of the baby carriage. Referring to FIG. 2, the left end of the connecting portion 38c of the stopper rod 38 is inserted through the projecting wall 24 formed on the fixed bracket 14 for the caster positioned on the left side of the baby carriage. As described above, the projecting wall 37 has a notch 25 and the rotary arm 37 has a through-hole 42. The connecting portion 38c of the stopper rod 38 extends through said notch 25 and through-hole 42. One leg portion 38a of the stopper rod 38 fits in the vertical groove 43 of the rotary arm 37 and its front end fits in the engaging recess 32 of the rotary yoke 15. Thus, the rotary arm 37 is able to rotate around the axis of the connecting portion 38c of the stopper rod 38 between the projecting walls 23 and 24. Since one leg portion 38c of the stopper rod 38 fits in the vertical groove 43 of the rotary arm 37, rotation of the rotary arm 37 causes the rotation of the stopper rod 38. In FIG. 2, the state to which the rotary arm 37 and stopper rod 38 are turned from the illustrated position is shown in dash-dotted lines.

Referring to FIG. 2, the shaft 41 of the rotary arm 37 and the shaft 26 of the fixed bracket 14 are interconnected by a return spring 44. The return spring 44 acts to turn the rotary arm 37 clockwise as viewed in the figure at all times, that is, it urges to bring the leg portion 38a of the stopper rod 38 into engagement with the engaging recess 32 of the rotary yoke 15. If the stopper rod 38 is engaged with the engaging recess 32, the rotary yoke 15 cannot rotate relative to the fixed bracket 14. That is, the swiveling action of the caster 11 is inhibited.

On the other hand, if the rotary arm 37 is turned counterclockwise against the force of the return spring 44 as shown in dash-dotted lines in FIG. 2, the engagement between the stopper rod 38 and the engaging recess 32 is canceled, so that the swiveling action of the caster 11 is allowed. In the state in which the rotary yoke 15 has turned through 180 degrees from the state shown in FIG. 2, the stopper rod 38 will engage the other engaging recess 33.

Though not shown, it is arranged that the other leg portion 38b of the stopper rod 38 will fit in either of the engaging recesses of the rotary yoke of the caster attached to the right side front leg of the baby carriage. Since the leg portions 38a and 38b of the stopper rod 38 are integrally connected by the connecting portion 38c, the rotation of one leg portion 38a caused by the rotation of the rotary arm 37 results in the rotation of the other leg portion 38b. Therefore, the swiveling action of the pair of casters 11 positioned on both sides can be inhibited or allowed by rotatively operating the rotary arm 37.

Referring to FIG. 2, a wire guide member 46 is secured to the front leg 12 by a pin 45 adjacent the upper end of the rotary arm 37. The wire guide member 46 is provided with a shaft 47. The front leg 12 is provided with wire position switching means (not shown) and a wire 48 extending therefrom is entrained around the shaft 47 of the wire guide member 45 and is connected to the shaft 39 of the rotary arm 37. The wire position switching means switches the wire 48 between a relatively high position and a relatively low position.

When the wire 48 has been brought to the relatively high position by the wire position switching means, the rotary arm 37 is pulled by the wire 48 to assume the dash-dotted line position in FIG. 2. In this state, the engagement between the stopper rod 38 and the rotary yoke 15 is canceled by the swiveling action of the caster 11 is allowed. On the other hand, when the wire 48 has been brought to the relatively low position, the rotary arm 37 returns to the solid line position in FIG. 2 under the action of the return spring 44. In that state, since the stopper rod 38 is engaged with the engaging recess 32 of the rotary yoke 15, the swiveling action of the caster 11 is inhibited.

The operation of the embodiment of the invention will now be described.

Suppose that the baby carriage is being moved in the face-to-back push mode as shown in FIG. 15. Then, referring to FIG. 1, the axle 16 of the wheels 17 is positioned at the extreme right end in the elongated opening 29. That is, the axle 16 is positioned rearwardly of the axis 9 of rotation of the rotary yoke 15 with respect to the direction of travel. Suppose that in this state the rotation of the rotary yoke 15 relative to the fixed bracket 14 is inhibited. That is, as shown in solid lines in FIG. 2, the stopper rod 38 is engaged with the engaging recess 32 of the rotary yoke 15.

Then, suppose that the push rod of the baby carriage is switched to the face-to-face push mode and is moved with the casters 11 in the locked state. Then, the wheels 17 together with the axle 16 move backward with respect to the direction of travel. Finally, the axle 16 is positioned at the left end of the elongated opening 29 in the rotary yoke 15 in FIG. 1. In this state, the axle 16 of the wheels 17 is positioned rearwardly of the axis 9 of rotation of the rotary yoke 15 with respect to the direction of travel. Therefore, the swiveling of the wheels as described with reference to FIG. 18 will not occur.

According to the embodiment described above, since the axle 16 of the wheels 17 will be always positioned rearwardly of the axis 9 of rotation of the rotary yoke 15 relative to the direction of travel, there is no trouble to the operability of the baby carriage even when the baby carriage is moved with the casters 11 locked and with the direction of travel reversed.

Referring to FIG. 6 in the embodiment described above, the elongated opening 29 extends across the axis 9 of rotation of the rotary yoke 15. More particularly, the center of the horizontally extending elongated opening 29 substantially coincides with the axis 9 of rotation of the rotary yoke 15. However, as a modification, the elongated opening 29 may be formed so that its one end substantially coincides with the axis of rotation of the rotary yoke 15.

The axle guide 35 shown in FIGS. 1, 8 and 9 serves for smooth movement of the axle 16 of the wheels 17, but this axle guide 35 is not absolutely necessary. Further, in the embodiment described above, the rotary arm 37 and stopper rod 38 are used as the caster locking means 18, but other forms of locking means may be contemplated.

The description so far refers to casters which are attached to the front legs of a baby carriage the push rod of which can be switched between two states, the face-to-back push mode and the face-to-face push mode. In baby carriages with such two push modes, casters may be attached not only to the front wheels but also to the rear wheels; in that case, the change of direction of the baby carriage in both the face-to-back and face-to-face push modes is facilitated and a much improved operability is obtained.

The invention is not limited in application to baby carriage, but it is likewise applicable to other target movable bodies, such as pushcarts.

Although the present invention has been described and illustrated in detail, it is clearly understood that the same is by way of illustration and example only and is not to be taken by way of limitation, the scope of the present invention being limited only by the terms of the appended claims.

What is claimed is:

1. A caster comprising a fixed bracket (14) attached to a body to be moved by the caster, a rotary yoke (15) supported by said fixed bracket (14) so that said rotary yoke is rotatable around a vertical axis (9) defined by said fixed bracket, a horizontal wheel axle carried by said rotary yoke, two wheels (17) rotatably supported by said horizontal wheel axle of said rotary yoke, said rotary yoke (15) having an elongated opening (29) extending through said rotary yoke and horizontally at right angles to said wheel axle (16) and across said vertical axis (9) of said rotary yoke, said wheel axle (16) being held in said elongated opening for moving horizontally in said elongated opening (29), said two wheels being mounted on opposite ends of said wheel axle (16) extending through said elongated opening (29), said caster further comprising an axle guide (35) and means pivoting said axle guide to said rotary yoke so that said axle guide (35) overlaps said elongated opening (29) in said rotary yoke, said axle guide (35) having two spaced legs interconnected at one end, each leg having an elongated guide opening (36) therein, said guide openings registering with each other and extending toward a pivot axis (34) of said axle guide, said wheel axle (16) passing through said elongated guide openings, so that said wheel axle (16) is held at an intersection between the elongated opening (29) in said rotary yoke (15) and said elongated guide openings (36) in said axle guide (35) further comprising a separate caster locking means (18) movable between a first position and a second position, said rotary yoke having a plurality of recesses, said locking means engaging in said first position one of said recesses in said rotary yoke (15) to inhibit rotation of said rotary yoke (15).

2. The caster of claim 1, wherein said body to be moved by said caster is a baby carriage.

3. The caster of claim 1, wherein said movable body is a baby carriage having a push rod and means for switching said push rod between two modes, namely a face-to-back push mode and a face-to-face push mode, said casters being attached to lower ends of front and rear legs of said baby carriage.

4. The caster of claim 1, wherein said elongated opening (29) is located in said rotary yoke in such a position that said vertical axis (9) divides said elongated opening (29) into two equal portions.

5. The caster of claim 4, wherein said journal axis (34) of said axle guide (35) and said vertical axis (9) intersect each other at a right angle.

* * * * *

UNITED STATES PATENT AND TRADEMARK OFFICE
CERTIFICATE OF CORRECTION

PATENT NO.   :   4,779,304

DATED        :   October 25, 1988

INVENTOR(S)  :   Kenzou Kassai

It is certified that error appears in the above-identified patent and that said Letters Patent is hereby corrected as shown below:

On the title page:
 In [73] Assignee, replace "Aprica Kassai Kabushiki Kaisha" by --Aprica Kassai Kabushikikaisha--;

In the Abstract, line 5, delete "is";

line 6, replace "formed" by --has--.

Signed and Sealed this

Twenty-eighth Day of February, 1989

Attest:

DONALD J. QUIGG

*Attesting Officer*    *Commissioner of Patents and Trademarks*